United States Patent [19]

Vatterott

[11] 4,158,967
[45] Jun. 26, 1979

[54] POWER BRANCHING SPUR GEAR SYSTEM

[75] Inventor: Karl-Heinz Vatterott, Braunfels, Fed. Rep. of Germany

[73] Assignee: A. Friedr. Flender & Co., Bocholt, Fed. Rep. of Germany

[21] Appl. No.: 793,474

[22] Filed: May 3, 1977

[30] Foreign Application Priority Data

May 6, 1976 [DE] Fed. Rep. of Germany ....... 2619996

[51] Int. Cl.² .................... F16H 57/00; F16H 1/28
[52] U.S. Cl. ............................... 74/410; 74/801
[58] Field of Search .................. 74/410, 411, 409, 801

[56] References Cited

U.S. PATENT DOCUMENTS

| | | | |
|---|---|---|---|
| 2,623,396 | 12/1952 | Beier | 74/410 X |
| 2,801,552 | 8/1957 | Stubbings et al. | 74/411 X |
| 3,080,775 | 3/1963 | Fritsch | 74/410 X |
| 3,292,460 | 12/1966 | Fritsch | 74/410 X |
| 3,314,310 | 4/1967 | Quenneville | 74/410 X |
| 3,315,546 | 4/1967 | Fritsch | 74/410 X |
| 3,315,547 | 4/1967 | Fritsch | 74/410 X |

*Primary Examiner*—Leonard H. Gerin
*Attorney, Agent, or Firm*—Sprung, Felfe, Horn, Lynch & Kramer

[57] ABSTRACT

A power branching spur gear system has two main wheels which come into contact with one another through more than three intermediate wheels. Each intermediate wheel meshes with both main wheels, and every two intermediate wheels are disposed at a bearing element which is linked to a linking point which is non-coincident with the bearings of the intermediate wheels. The linking points of the bearing elements are directly or indirectly connected to one another by coupling members. The linking point of at least one bearing element is positioned in a scissor-shaped area, which is formed by the two resultant bearing forces of the two intermediate wheels which are disposed on the bearing element and in which the resultant of both bearing forces lies. The intermediate wheels exercise equidirectional torques on each main wheel.

7 Claims, 9 Drawing Figures

POWER BRANCHING SPUR GEAR SYSTEM

The invention relates to a power branching spur gear system having two main wheels which come into contact with one another through more than three intermediate wheels, each intermediate wheel meshing with both main wheels, each two intermediate wheels being disposed at a bearing element linked to a linking point which is not synchronized with the bearings of said intermediate wheels, the linking points of said bearing elements are directly or indirectly connected to one another by means of coupling members.

A gear can comprise several transmission steps. A transmission step of the gear dealt with here has in every case two main wheels (central wheels) and several intermediate wheels meshing with the two main wheels. In the case where the intermediate wheels move in a circle around one of the main wheels, one speaks of a planetary gear. Conversely, if the intermediate wheels are fixed, then this is spoken of as a fixed (standard) gear. Moreover, the gear can be once more subdivided according to whether both main wheels mesh at their outer front sides with the intermediate wheels (AA gears), whether both main wheels mesh as toothed wheel rims on their insides with the intermediate wheels (II gears) or whether a main wheel meshes on its outside and a main wheel meshes like a toothed wheel rim on its inside with the intermediate wheels (AI gears). In the case of the AA gears in particular the special feature is mostly that in each case two wheels are arranged adjacent one another on one axis in order to mesh with the two main wheels. These two wheels will be regarded as a single intermediate wheel (staged intermediate wheel).

In the case of AI gears, it was recognised previously that the optimum load equalisation (load distribution) of the power branches (intermediate wheels) represents a significant criterion for the quality of the power density (power/weight) of the gear.

The following among others are known for this:

the Stoeckicht developments (e.g. German PS's 556 683, 669 889, 682 275, 737 886, 858 185, 1 157 059);
the Fritsch inventions (e.g. German PS 1 208 586);
the assembly of elasticities (e.g. German PS's 1 157 059, 682 275, 1 038 362, 1 173 305, 1 132 772, 1 290 401;
elasticities and the requirement for a high degree of finishing accuracy (e.g. German PS's 1 173 305, 1 132 772, 1 227 749);
the statically specified load equalisation (e.g. 2 304 872);
the choice of synchronized tolerance zones to achieve a particular equalisation in load pressure of tooth flank.

Many gear systems can merely be used for three power branches with only kinematic load equalisation as the absent bearing of the drive and/or the side wheel, the power branch, the side wheel and the power branches or the drive wheel and the power branches is directly or indirectly replaced in the frame by the three support points.

It is necessary to select these support points in such a manner that no ineffective locking occurs.

The known construction possibilities can be partly altered with the assistance of a suited choice of tolerance of these support points and of a swivel joint additionally arranged in the frame, which joint not influencing the function of the equalisation process. This characteristic results from the special geometrical arrangement of the supports. All the construction parts or groups of construction parts, which are not disposed directly or are disposed indirectly in the frame of the spur gear system, can be arranged according to known possibilities in correspondingly flexible construction parts. The spring resistances are hereby additional present as forces and must be taken into consideration as load (Cunliffe, Smith, Welbourn: "Dynamic Tooth Loads in Epicyclic Gears", Transactions of the ASME, May 1974).

Spring resistances are, depending on the layout of the construction parts, accordingly subject to heavy tolerances. They can be taken into consideration by a sufficient safety factor in the layout of the gear.

The construction types of gear with four or more than four power branches contrast thereto. The suited selection of tolerances alone is not sufficient here. Conversely the elasticities are also subject to the known uncertainties. An optimum load equalisation, however, was until now only possible from the purely kinematic viewpoint—all gear members are idealized as being inflexible—with a relatively large number of equalising members.

A gear of the aforementioned type is known from the German Auslegeschrift No. 2 304 872. In this known gear the linking point of the bearing element (rocker) of two intermediate wheels is arranged at a point which should prevent the bearing element from swinging. With ideal geometry a good load equalisation can be achieved thereby. Conversely, with the usual deviations in measurement (tolerances) the situation may arise in which intermediate wheels do not become meshed and a favourable load distribution is consequently not provided.

The object of the invention is to develop a gear system which achieves an optimum load equalisation with the usual tolerances.

This object is solved according to the invention by the linking point of at least one bearing element being positioned in a scissor-shaped area, which is formed by the two resultant bearing forces of the two intermediate wheels which are disposed on the bearing element and in which the resultant of both bearing forces lies, and that said intermediate wheels exercise rectified torques on each main wheel.

The gear system according to the invention achieves a very favourable load distribution on all wheels. A favourable use of material and construction parts and a favourable power weight can be achieved thereby. In the case of a deviation in dimension horizontal swinging and/or shifting of the bearing elements of the non-disposed main wheels and, if present, of the coupling members has the effect that all intermediate wheels on both sides remain meshed. No change in arrangement of the toothed wheels occurs, but all toothed wheels are constantly meshed so that only a low degree of abrasion and a low noise level occurs. No inner gear stress occurs hereby. In addition the gear can be easily calculable and thus a high degree of constructional safety can be achieved.

The invention serves to improve the load equalisation of spur gears (in toothed wheel gears on the tooth flanks) with the lowest possible number of members (parts), e.g. wheels, bearing elements, frame. For this they need the supporting function of the contact points and the tooth flanks of four or more intermediate wheels, e.g. planetary wheels, respectively. Due to the supports and with a minimum proportion of members (number of members) an element chain or element chains are neither directly nor indirectly disposed in the frame. (What is meant by an element chain is an element of several members each acting on one another.) The support points of the intermediate wheels are formed with the tooth flanks of both central wheels (main wheels).

Although the gear has the calculated degree of freedom $F=1$ (in the case of a non-disposed element chain) and $F=3$ (in the case of two non-disposed element chains) respectively, it necessarily results on neglecting the tolerances that the gear has the degree of freedom $F=1$ between the drive and output.

Consequently a specific output movement follows an input movement. This gear structure can be extended by a member with an additional linking point or by a member with two additional linking points to provide a gear with the degree of freedom $F=2$ between the input and output member (cf. Muller, "Umlauf-Kurbelgetriebe" in the journal "Konstruktion", year 25, book 3 of March 1973).

Drive and output torques are to be introduced thereby into the non-disposed element chains so that if possible no forces are transferred, or only the weight forces are to be compensated by, for example, couplings.

A particularly favourable construction can be achieved if the linking point of each bearing element lies on the resultant of both bearing forces of the two intermediate wheels disposed on the bearing element.

Further advantageous developments are discussed in the subclaims.

Embodiments of the invention are respresented in the drawings and described below in greater detail:

Figure 1:
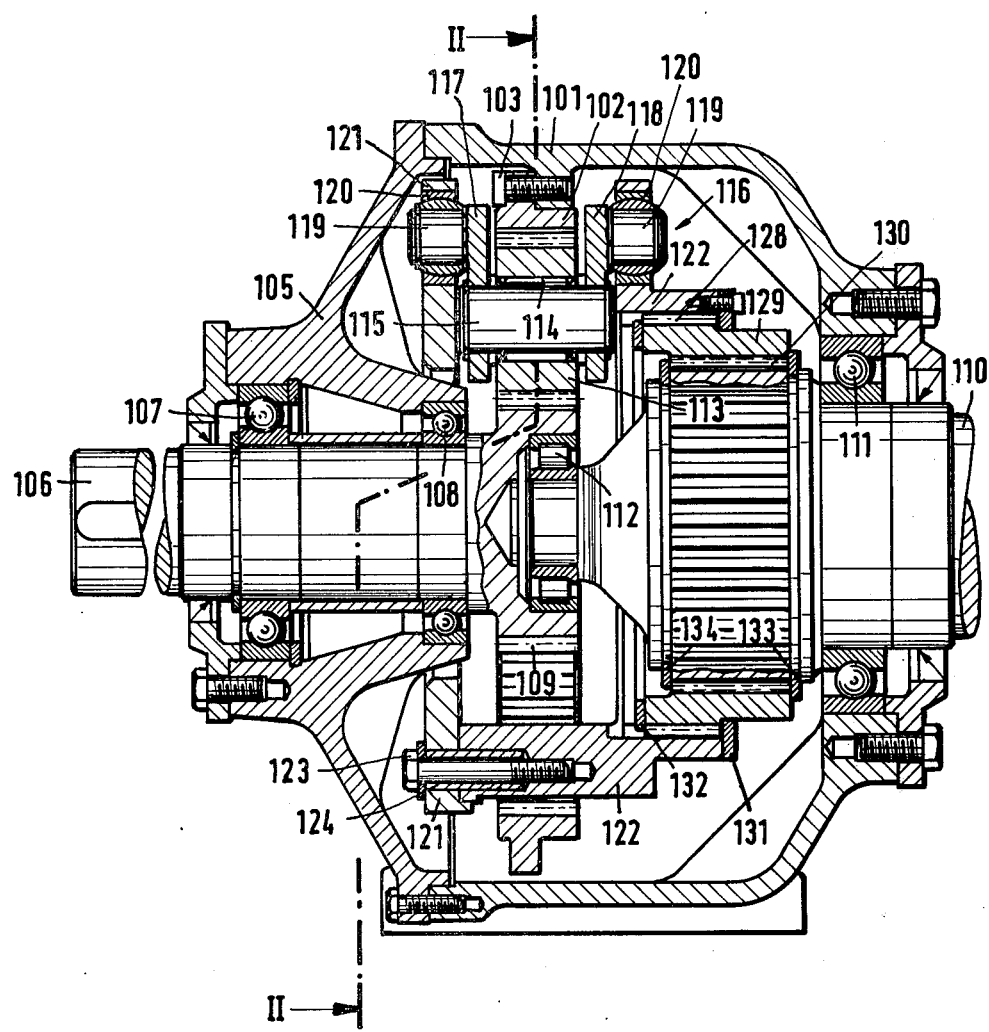
FIG. 1 shows a section through a first embodiment.

A special number of members and of elements appertaining thereto is necessary for coupling the intermediate wheels. The number of members with three elements amounts to p minus 2, if the following postulates exist: drive and output are neglected, the number of intermediate wheels is designated p, a minimum number of members exist and only a kinematic load equalisation exists. Each two intermediate wheels are arranged on a ternary member of a bearing element. An intermediate wheel remaining with an uneven intermediate wheel number must be disposed singly on a ternary member. The other remaining members and elements serve to form the linking points of the members onto the others.

All the coupled ternary members form a formation of members which is characterized as an intermediate wheel carrier. In the total gear formation the linking points must be arranged for the formation of the intermediate wheel carrier in such a way that members can constantly be moved relatively to one another, since otherwise the load equalisation could not always be produced due to the missing equalisation possibilty and the finishing accuracy.

It is necessary for gears with a positive load equalisation that the linking point of a bearing element, which serves to connect the ternary members amongst themselves, lies in a specific area. This is characterized by the tooth forces of both intermediate wheels which are disposed on the member. Positive load equalisation signifies that all equivalent tooth forces, which act on the one part from a main wheel on the intermediate wheels and on the other part from the intermediate wheels on the second main wheel, cause rectified torques.

Two tooth forces (tooth normal forces) W41; W42; W43; W44; W45; W46; W47; W48 (FIG. 3), which have a joint cutting point S41; S42; S43; S44, arise at each intermediate wheel 43, 44, 47, 48. The line of action R41; R42; R43; R44 of the resultant tooth forces of an intermediate wheel runs through this and the intermediate wheel rotational axis D41; D42 appertaining thereto in the ternary member. This line of action corresponds to the direction of the bearing force. The fulfilment of a particular geometrical condition is required for the bearing elements (rockers) 41, 42 which are to effect the positive load equalisation of the two intermediate wheels amongst themselves. The gears with four intermediate wheels are exceptions. Only one member in these gears is laid out according to the required condition, whereby the geometry of the other is necessarily fixed. Scissor-shaped areas result from the lines of action R41, R43; R42, R44 of the bearing forces of each two intermediate wheels act on a bearing element.

One area provides a positive load equalisation (in FIG. 3: the two shaded areas), the other area provides a negative load equalisation. If a positive load equalisation is achieved, all equivalent tooth forces produce torques in the same direction. In the case of an optimum load equalisation, all equivalent tooth forces are of the same magnitude. They produce identical torques according to size and direction. The negative load equalisation is opposed hereto. This effects idle power and increased tooth loads within the gear. A greater construction part load and a more unfavourable degree of effect than in the case of the gear with positive load equalisation result hereby. The negative load equalisation leads to stresses amongst the intermediate wheels in the load condition. This signifies no change in the arrangement of the tooth flanks in the case of a reversal in the rotation direction. In the limit case of the negative load equalisation, the four tooth forces W41 to W48 meshing directly into a rocker have a joint resultant line of action which runs through the point of intersection A41; A42 of the two intermediate wheel bearing forces R41, R43, R42, R44 and the centre 2. Self-locking occurs hereby.

The line of action B41; B42 resulting form the four tooth forces with optimum load equalisation constantly lies in the positive area, the four tooth forces thereby acting directly on the bearing element. Optimum load equalisation here means that all equivalent pairs of teeth with ideal geometry have equally great tooth forces and cause rectified torques. Generally, the most favourable load equalisation is provided when the linking point G41, G42 of the bearing element 41, 42 lies on the line of action B42, B41 resulting from the four tooth forces of the intermediate wheels appertaining thereto.

The linking points G41, G42 should have a sufficient distance from the resultant bearing forces R41, R43 or R42, R44 to take account of all possible tolerances.

In the limit case of the positive load equalisation, the bearing element rotating point G42 is arranged on the line of action of an intermediate wheel bearing force R42.

In this case one or several of the intermediate wheels can be without tooth load.

The displacement of all members relatively to the reference system is necessary to achieve a statically specified load equalisation of all intermediate wheels. The kinematic load equalisation, i.e. the movement of all members, must be possible on the basis of the finishing accuracy. Therefore kinematics must be primarily consulted as a consequence of the tolerances. If an equalisation movement is guaranteed in each position, then all intermediate wheels can be brought into question for the transfer of power for different areas. The static stipulation of tooth forces of all intermediate wheels is only possible in this case. The third rotational axis of a plate, on which the two intermediate wheels are rotationally disposed around the two other rotational axes, must not run through the point of intersection A41; A42 which results from the lines of action of the two intermediate wheel bearing forces.

This is immediately the point of rotation (instantaneous centre of rotation, immediate point of rotation) of the plate considered in the reference system which is formed from the two central wheels. A bearing application of the bearing element in the instantaneous centre of rotation would not guarantee the equalisation possibility of all intermediate wheels in the acceptance of inflexible plates.

To compensate the weight forces or decrease the running noise the aforementioned non-disposed element chains, which may be composed of only one wheel, can be elastically coupled to a correspondingly supported or disposed member. There is also the possibility for the improvement of the running characteristics of choosing a basic gear with the previously described characteristics. This can be improved by incorporating additional intermediate wheels to increase the power density. They can be elastically disposed on the members already present or the load equalisation is achieved by means of elastic support points. Elastic bearing arrangements and support points can diminish the equalisation possibilities of the "quasinon-disposed group of members".

For example, with the assistence of the kinematic reversal of the gear a fixed (standard) gear becomes an epicyclic gear (planetary gear). The kinematics of the gear does not change hereby. Only the frame member is exchanged. Various construction parts can thereby be replaced by kinematically equal groups of members (e.g. through the incorporation of Assur groups). Consequently, a plurality of kinematically equal replacement gears results from one basis gear. However, many of these gears are only operable in the instantaneous position (e.g. ratched gears).

Figure 7:
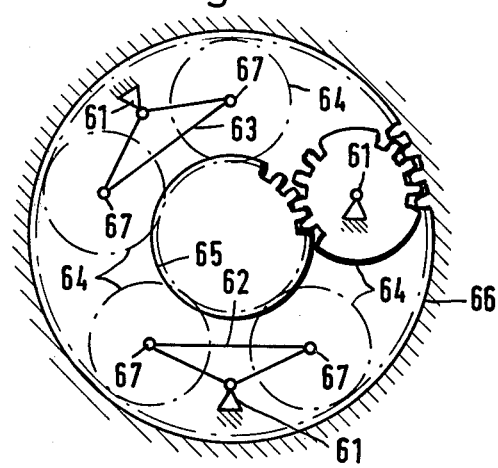
Figure 8:
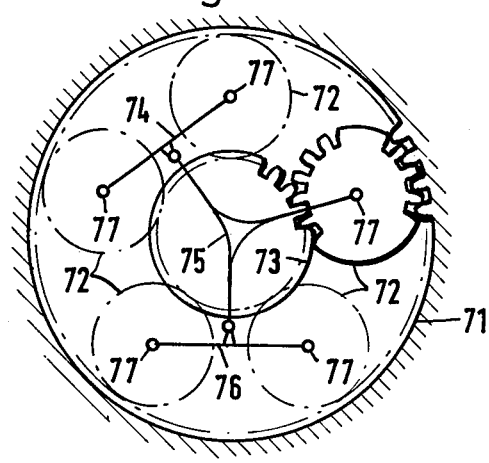

In the case of a minimum number of members (e.g. FIG. 5) of the tooth chains of one of the present members is to be selected as reference member, i.e. as frame (stationary part, e.g. housing or stationary toothed wheel) for the total degree of freedom of the gear $F=I$ (if an unequivocal output movement is coordinated to the input movement on neglecting the tolerances). The gear members are then coordinated to one another, but the frame member has still to be secured. If FIG. 6 serves as a basis of illustration, then possible types of gear constructions are represented in FIGS. 7 and 8. One of the two element chains, which has not previously been disposed in the frame, can be disposed in the frame to compensate the weight. The remaining element chain then takes on the equalisation movement alone. All those element chains which are not disposed in the frame are supported on the tooth flanks. Hereby three supporting points are in each case to be regarded as a replacement linking point, these supporting points resulting from all intermediate wheels and a central wheel as well as the star-shaped element chain. The replacement linking point is a geometrical location for the description of each respective member position.

The frame is to be selected as additional member for the total degree of freedom of the gear $F=2$ (i.e. two input and output movements are coordinated to an output and input movement respectively). A member of an element chain is to be flexibly arranged in this selected reference member. There is also the possibility of disposing two members. However, these should not belong to the same element chain and a relative coordination of these bearing applications must be taken into account.

In order to at least partly compensate the weight of the non-disposed element chain in the construction of known spur gears which has until now been regularly neglected, this can be coupled elastically to members with equal relative angular velocities. Only supported or supported and disposed element chains can be resiliently connected with one another. In addition there is also the possibility of incorporating an intermediate wheel group with optimum load equalisation and arranging further intermediate wheels elastically to improve the running characteristics. The central axes of all intermediate wheels are to be defined in such a way that the average relative velocity in relation to the frame is maintained during operation. Gears with further intermediate wheels, the load equalisation of which is achieved through flexible support surfaces, are constructively equivalent.

The power is for expedience to be supplied and withdrawn at the member disposed in the frame. External forces resulting thereby are compensated by the positioning of the frame. The external power should be diverted or supplied to the non-disposed element chains if possible free of force by, for example, couplings. In addition, the "quasi-frame fixed member" can also be formed as an equalising element chain. The rotation movement hereby is restricted by possible couplings whilst radial movements can be carried out.

The equalising element chain should possibly be supported in axial direction depending of the type of tooth formation and operational arrangement of the gear (e.g. by axial bearings or construction elements functioning in a similar manner).

The invention enables the creation of numerous embodiments. All the wheels in the drawings are represented as toothed wheels. They can however also be frictional wheels.

Figure 2:
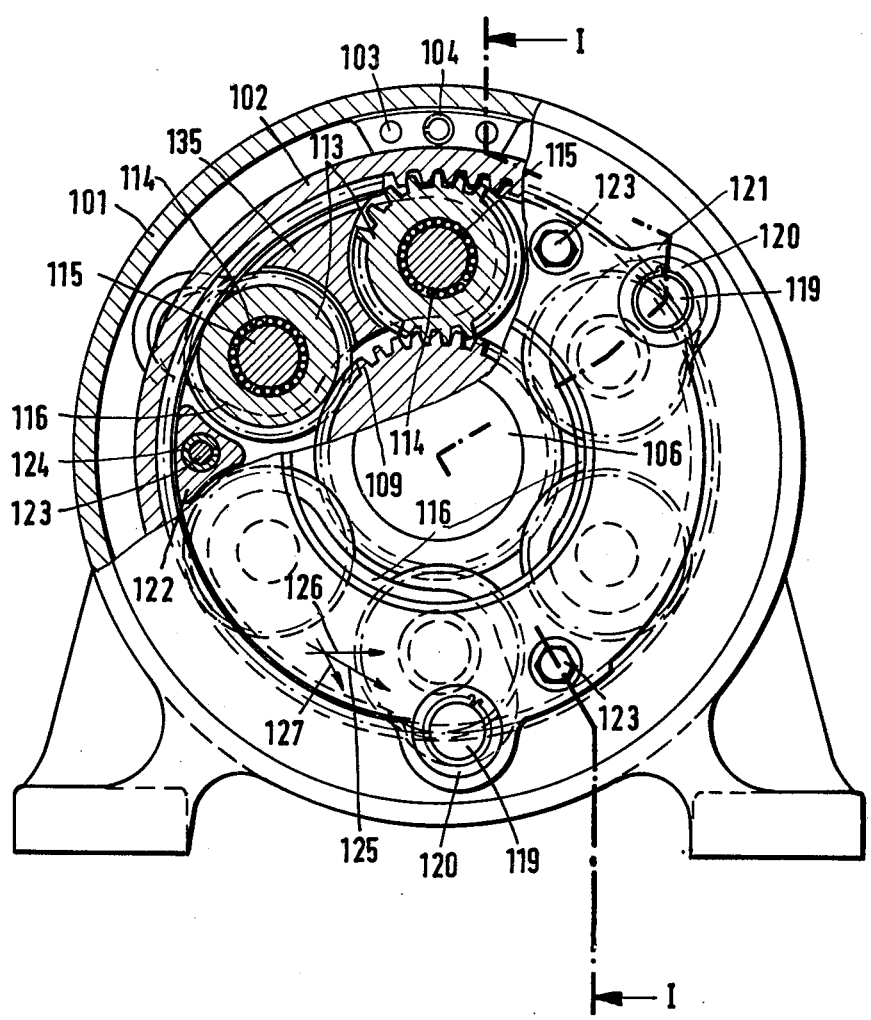
FIG. 2 shows a section cut along the line II—II in FIG. 1.
Figure 4:
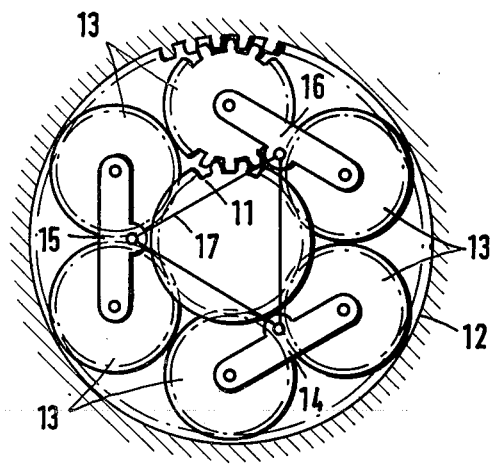
FIG. 4 shows a schematically represented section through a third element.

A spur gear system according to the invention is shown in FIGS. 1 and 2 and has schematically a method of construction according to FIG. 4. The outer central wheel 102 is secured at several points in the housing 101 by means of screws 103 and adapter sleeves 104. The drive shaft 106 is disposed in the housing cap 105 with the aid of the ball bearing 107 and 108. The drive shaft bears the inner central wheel 109. The output shaft 110 is disposed in the housing 101 by a ball bearing 111 and in the drive shaft by a cylindrical roller bearing 112. The inner central wheel 109 meshes with the planetary wheels 113 (intermediate wheels). The planetary wheels are disposed on the bolts 115 by means of a needle roller bearing 114 and are supported in the outer central wheel 102. Two planetary wheels are each arranged in a bearing element (rocker) 116. Each bearing element is composed of two mirror-inverted lateral elements 117, 118 which are connected to form a unit by means of a bridge 135. The lateral elements 117 and 118 bear coaxially arranged pins 119 (linking points) on which the joint bearings 120 are set. The lateral elements 118 are hereby connected to the ring 121 and the lateral elements 118 to a planetary carrier (coupling member) 122 so as to be swivellable. Ring 121 and planetary carrier 122 are bolted to form a unit so as to be rotationally rigid by means of screws 123 and adapter sleeves 124. The planetary carrier 122 bears three swivellable bearing elements 116, which each dispose two planetary wheels, jointly with the ring 121.

The rotation point of the pin 119 of the bearing parts 116 lies on the joint (resultant) line of action 125 of the bearing forces 126 and 127 of the needle bearing 114 of each bearing element 116. The line of action 125 at the same time runs through the point of intersection of the two bearing forces 126 and 127 of a bearing element 116. The planetary carrier 122 is provided with a coupling toothing 128 on its right-hand side, through which toothing said carrier is in shiftable but rotationally rigid contact with the drive shaft 110 by means of a coupling ring 129 and a further axially displaced coupling toothing 130. The coupling ring 129 and the planetary carrier 122 become axial with the assistence of the safety rings 131, 132, 133 and 134 but are guided with the necessary clearance.

Each planetary wheel 113 can at any time be adjusted by means of the special linking of the members 116 to the planetary carriers 122 and the ring 121 and its freely shiftable linking to the drive shaft 110 in such a manner that all planetary wheels are equally loaded.

Figure 3:
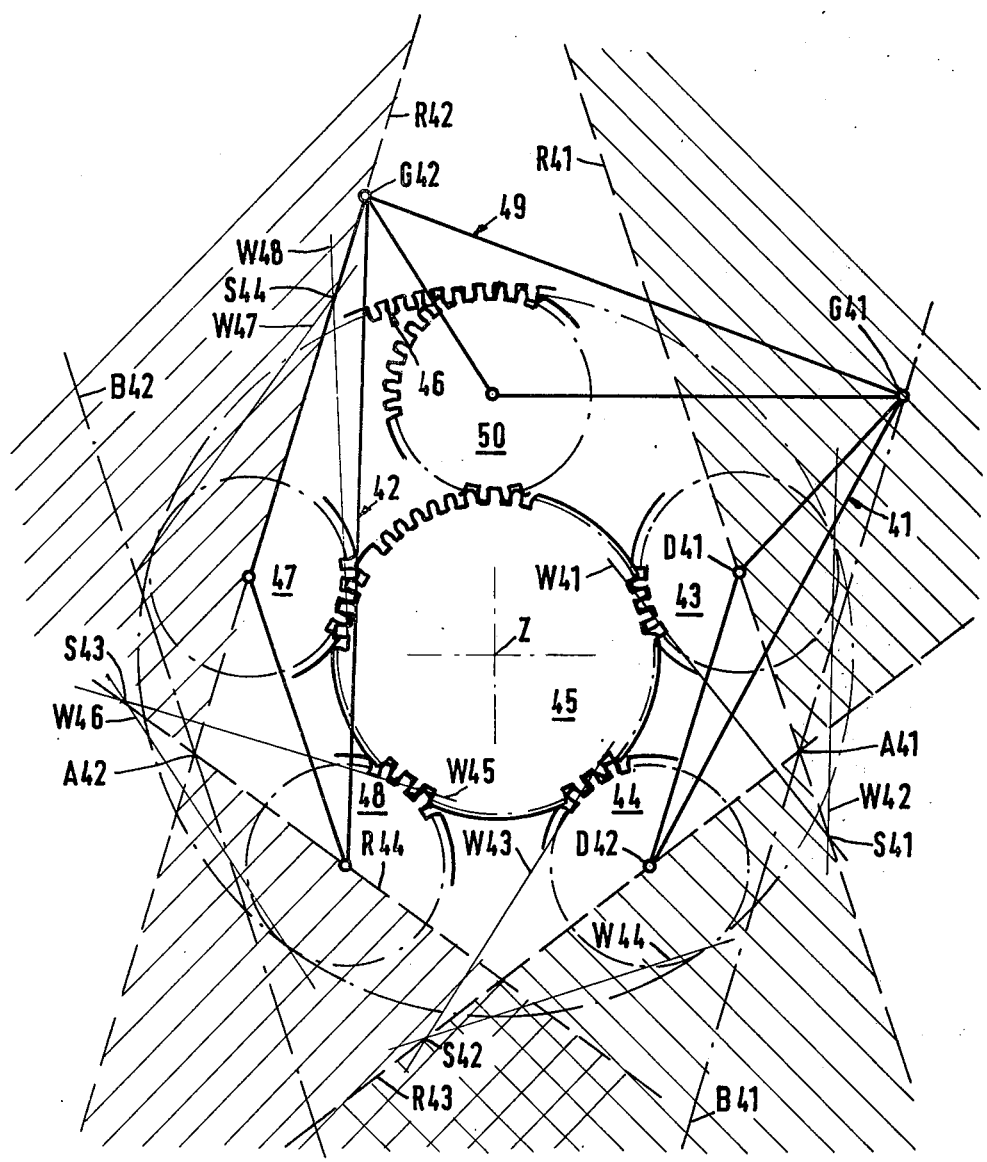
FIG. 3 shows a schematically represented section through a second embodiment.

FIG. 3 shows an AI gear with an inner main wheel 45 and an outer main wheel (toothed ring) 46 and with five intermediate wheels, two of each of which 43, 44 and 47, 48 are disposed on bearing elements 41, 42 and the fifth 50 on a coupling member 49, to which both bearing elements are linked at their linking points G41, G42. The lines of action W41; W42; W43; W44; W45; W46; W47 and W48 characterise the force directions of the pairs of teeth for a specific load condition. (A positive load equalisation is represented.) Two of each of the force vectors W41 and W42; W43 and W44; W45 and W46 or W47 and W48 provide a joint point of intersection S41; S42; S43 and S44. The line of action R41; R42; R43 or R44 of the bearing force of the intermediate wheel considered runs through this point of intersection and the linking point appertaining thereto D41, D42 of the respective intermediate wheel 43, 44, 47, 48 on the bearing element (rocker) 41, 42. Two of each of these force vectors form two scissor-shaped areas. One is shaded, the other is not. If all the pairs of teeth transfer equal loads on neglecting the acceleration due to gravity and to the friction, then the resultant line of action B41 and B42 respectively of the forces of all tooth forces indirectly arising at a bearing element lies in the shaded area which characterises a positive load equalisation—represented here for two bearing elements.

Additionally, at least one of the linking points G41, G42 and/or bearing of a gear wheel and/or one of the wheels 43, 44, 45, 46 is of elastic structure. In another embodiment, at least one of the wheels 43, 44, 45 and/or the toothed wheel rim 46 is subdivided into segments which can be elastically connected among themselves.

Figure 3B:
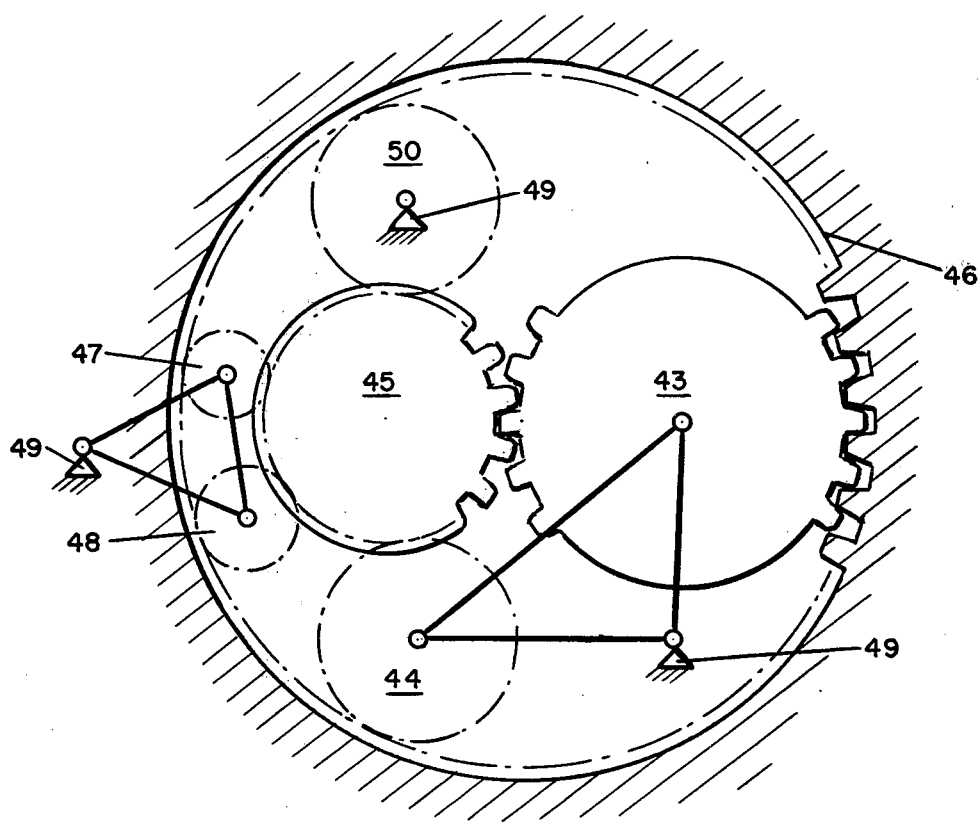
FIGS. 6–8 and 3B show schematically represented sections through further embodiments.

As shown in FIG. 3B, the main wheels 45',46' are arranged so that they are not coaxial to one another.

FIG. 4 shows an AI gear stage—also named "epicyclic wheels" or "planetary gear"—with the calculable degree of freedom F=3. Six planetary wheels 13 (intermediate wheels) are arranged between the sun wheel 11 and the support wheel 12 (main wheels). All planetary wheels are connected among themselves by an element chain composed of four ternary members 14, 15, 16 and 17 (three rocker-like bearing elements 14, 15, 16 and a middle coupling member 17, at which the three bearing elements are linked). The drive and output are not shown.

Figure 5:
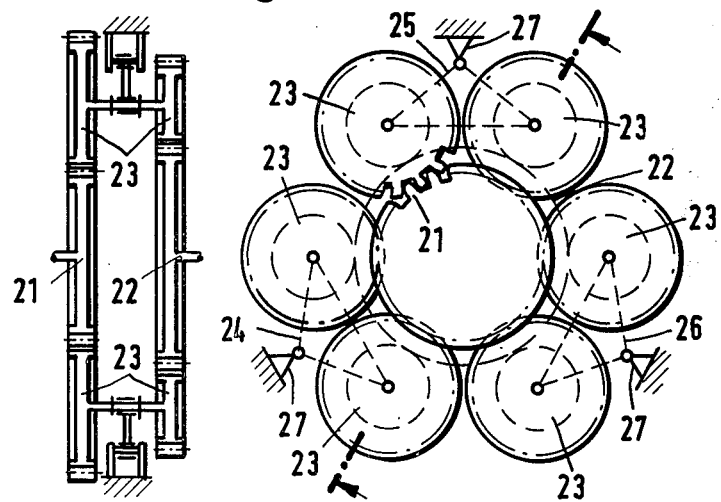
FIG. 5 shows a schematically represented section through a fourth embodiment including an axial section.

FIG. 5 shows a top view and section of an AA gear stage—also named "parallel shaft gear" or "multiple shaft gear"—with the calculable degree of freedom F=3. Six pairs of intermediate wheels 23 are arranged on the periphery of the two central wheels or main wheels 21 and 22, one pair of intermediate wheels being composed of two intermediate wheels of different size which are arranged on a rotational axis. Two of each of these pairs of intermediate wheels are disposed in the ternary members (rocker-like bearing elements) 24, 25 and 26. These ternary members 24, 25 and 26 are disposed in a ternary member: the frame 27.

Figure 6:
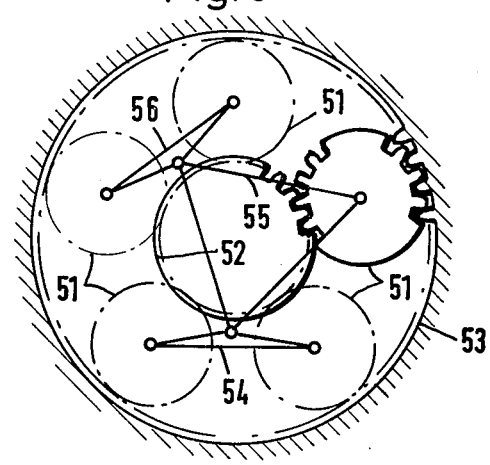

FIG. 6 shows an AI gear with five intermediate wheels 51 which are arranged between the central wheels 52 and 53. All the intermediate wheels are connected among themselves by a star-shaped element chain. This is composed of three ternary members, bearing elements 54, 56 and coupling member 55. Two AI gear structures in each case can be derived from this gear with the calculable degrees of freedom F=1 and F=3 (FIGS. 6 and 7).

FIG. 7 shows an AI fixed (standard) gear with the calculable degree of freedom F=3. One of the two ternary members provided in FIG. 5 was selected as frame 61. Two intermediate wheels 64 are in each case disposed in the two remaining members (bearing elements) 62 and 63 in the selected arrangement. The outwardly toothed central wheel is marked by 65 and the inwardly toothed central wheel by 66. The pairs of elements formed with the star-shaped element chain and the intermediate wheels, are marked by 67.

FIG. 8 shows an AI planetary wheel gear with the calculable degree of freedom F=3. One of the two central wheels (outer central wheel) provided in FIG. 5 was selected as frame 71. The position of the sun wheel 73 is defined with the aid of the planetary wheels 72. The star-shaped element chain composed of the ternary members 74; 75 and 76 has been maintained. The members 74 and 76 form the bearing elements for four planetary wheels and the member 75 is a coupling member at which the bearing elements and a planetary wheel are linked. The pairs of elements which are formed with the star-shaped element chain and the intermediate wheels, have been given the reference 77. Gears with a large number of planetary wheels with an optimum load equalisation can also be constructed through the instruction of the invention.

I claim:

1. In a power branching spur gear system having two main wheels which come into contact with one another through more than three intermediate wheels, each intermediate wheel meshing with both main wheels, each two intermediate wheels being disposed at a bearing element linked to a linking point which is non-coincident with the bearings of said intermediate wheels, the linking points of said bearing elements are directly or indirectly connected to one another by means of coupling members, wherein the improvement comprises the linking point of at least one bearing element is positioned in a scissor-shaped area, which is formed by the two resultant bearing forces of the two intermediate wheels which are disposed on the bearing element and in which the resultant of both bearing forces lies, and that said intermediate wheels exercise equidirectional torques on each main wheel.

2. Power branching spur gear system according to claim 1, wherein the linking point of each bearing element lies on the resultant of both bearing forces of the two intermediate wheels disposed on said bearing element.

3. Power branching spur gear system according to claim 1, wherein at least one of the main wheels, the bearing elements and the coupling members are not supported by the frame of the gear.

4. Power branching spur gear system according to claim 1, wherein at least one linking point, bearing of a gear wheel and wheel is of elastic structure.

5. Power branching spur gear system according to claim 1, wherein at least one wheel and/or a toothed wheel rim is subdivided into segments which can be elastically connected among themselves.

6. Power branching spur gear system according to claim 1 wherein the main wheels are not arranged coaxially to one another.

7. Power branching spur gear system according to claim 1, further comprising couplings arranged on the frame to keep radial and/or axial forces away from the wheels, bearing elements or coupling members, which are not disposed in the frame.

* * * * *